US005158104A

United States Patent [19]

Wilkins

[11] Patent Number: 5,158,104

[45] Date of Patent: Oct. 27, 1992

[54] PILOT-OPERATED SPILL VALVE ASSEMBLY

[75] Inventor: Larry C. Wilkins, New Albany, Ind.

[73] Assignee: Electromechanical Research Laboratories Inc., New Albany, Ind.

[21] Appl. No.: 822,605

[22] Filed: Jan. 17, 1992

[51] Int. Cl.$^5$ ........................ G05D 16/00; F16K 17/02

[52] U.S. Cl. ................................ 137/118; 137/624.27

[58] Field of Search .................. 137/624.27, 118, 110; 251/73

[56] References Cited

U.S. PATENT DOCUMENTS

| | | | |
|---|---|---|---|
| 3,040,772 | 6/1962 | Todd | 137/624.27 X |
| 3,710,813 | 1/1973 | Hodgman | 251/73 X |

*Primary Examiner*—Alan Cohan

*Attorney, Agent, or Firm*—Woodard, Emhardt, Naughton Moriarty & McNett

[57] ABSTRACT

On a liquid cargo tank of a barge, a pressure responsive pilot valve operates through a combination of levers to unlatch a main valve clamp arm. One lever is a latch arm having a first position engaging and retaining a latch stud mounted on the clamp arm, and having a second position free of the latch stud whereby the clamp arm is released. A latch hook normally retains the latch arm in the first position but is operable to a second position to free the latch arm from the restraint of the hook. A pilot-operated trigger arm is operable on the latch hook to move the latch hook from the latch arm retaining position to the latch release position. The trigger arm also is able to directly engage the latch arm for unlatching it if not already unlatched immediately upon freedom from restraint of the hook. The main valve seal disk is held closed under a spring-load by the clamp arm. The minimum valve closing load on the main valve is established by a high rate spring having a predetermined load and which is further loaded upon placement of the clamp arm in the latching position. Means are also provided to facilitate field testing of the valve-opening set point pressure.

11 Claims, 5 Drawing Sheets

OPERATOR – CLOSED

OPERATOR - OPEN

PILOT-OPERATED SPILL VALVE ASSEMBLY

BACKGROUND OF THE INVENTION

1. Field of the Invention

This invention relates generally to valves used on large containers of liquids, such as on the holds of river barges, for example, to enable contents of the container to be spilled from the top to avoid development of excessive pressure in the container at any time in general, and during filling operations in particular.

2. Description of the Prior Art

A commonly used approach to limiting internal pressure is to employ a valve which comprises a lid covering a circular opening in the top of a cargo tank. The lid has a hole in the center received on a guide post fixed in the tank, and which guides the lid as it opens and shuts. It is the weight of the lid which keeps it sealed on the opening in the top of the cargo hold. Several problems are encountered with such an arrangement. For one thing, the friction between the lid and the opening and the lid and the shaft causes the valve to be inaccurate with regard to the internal pressure at which the valve is intended open. Also, it is difficult to assure adequate spill volume without attendant and excessive internal pressure. Also, variations in response to internal pressure may occur as a result of accumulation of dirt, ice or other foreign matter on the valve guide. Also, accumulations of snow or ice on the lid may increase its weight to the point where excessive internal pressure will be reached before the valve will open.

It is an object of the present invention to overcome one or more of the shortcomings of the prior art as described above.

SUMMARY OF THE INVENTION

Described briefly, according to a typical embodiment of the present invention, a pilot valve operates through a combination of levers to unlatch a main valve clamp arm. These levers include a latch arm rocker having a first position engaging and retaining a latch stud mounted on the clamp arm, and having a second position free of the latch stud whereby the clamp arm is released, a latch hook normally retaining the latch arm in the first position but operable to a second position to free the latch arm from the restraint of the hook, and a pilot operated trigger arm operable on the latch hook to move the latch hook from the latch arm retaining position to the latch release position. The pilot operated trigger arm also has means thereon for direct engagement of the latch arm for unlatching the arm directly if not already unlatched immediately upon freedom from restraint of the hook. The main valve seal disk is held closed under a spring-load by the clamp arm. The minimum valve closing load on the main valve is established by a high rate spring having a predetermined load and which is further loaded upon placement of the clamp arm in the latching position. Means are provided for counterbalancing the hook and for counterbalancing the latch arm to facilitate resetting of the assembly. A reset lever with handle, and a cooperating abutment block on the clamp arm are provided for returning the valve clamp arm to its latched position against the resistance of the valve seal loading spring. Means are also provided to facilitate field testing of the valve-opening set point pressure.

DESCRIPTION OF THE PREFERRED EMBODIMENT

Figure 1:
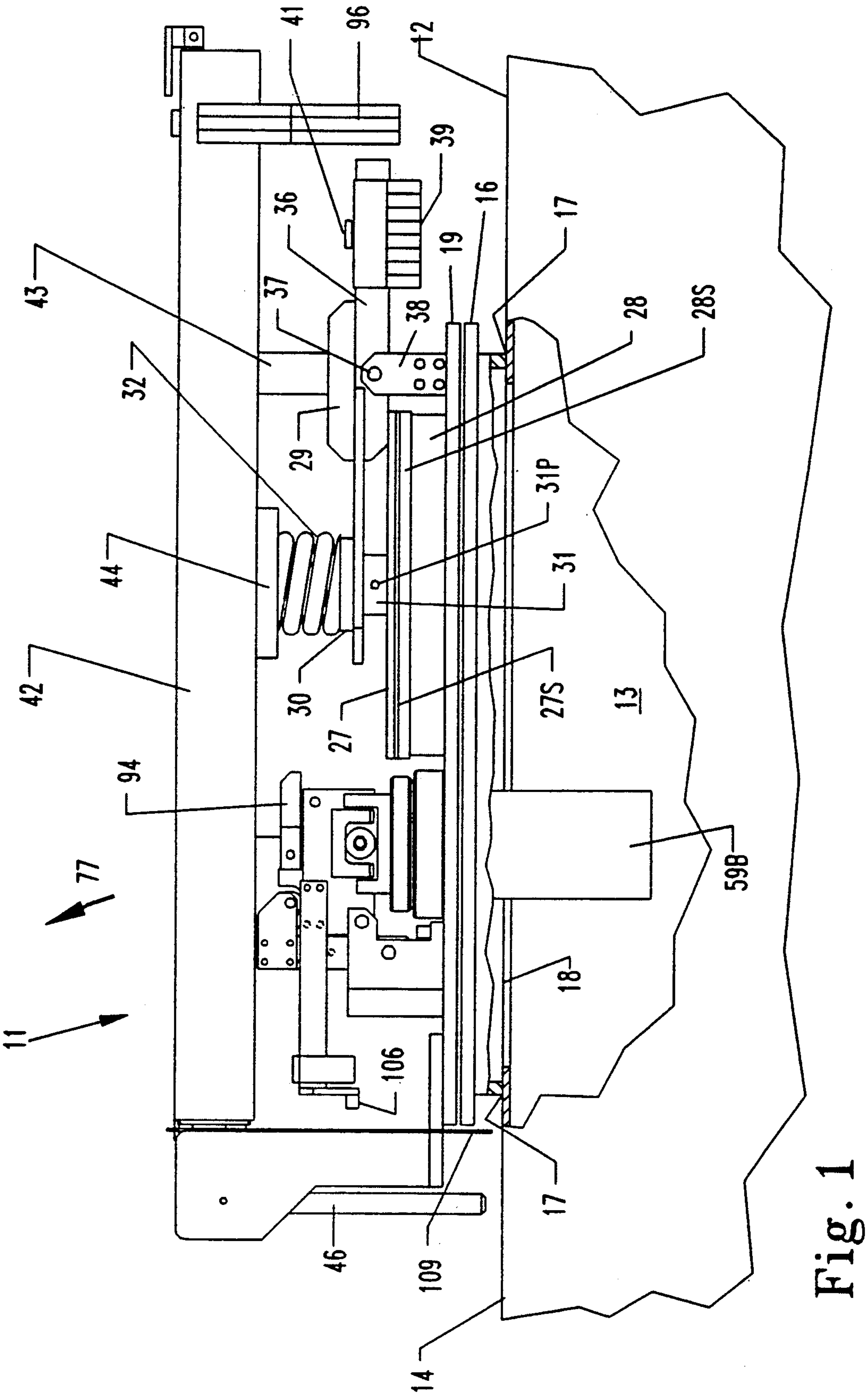
FIG. 1 is a side elevational view of a spill valve assembly according to the present invention mounted on top of a cargo hold tank of a marine barge, shown fragmentarily.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3:
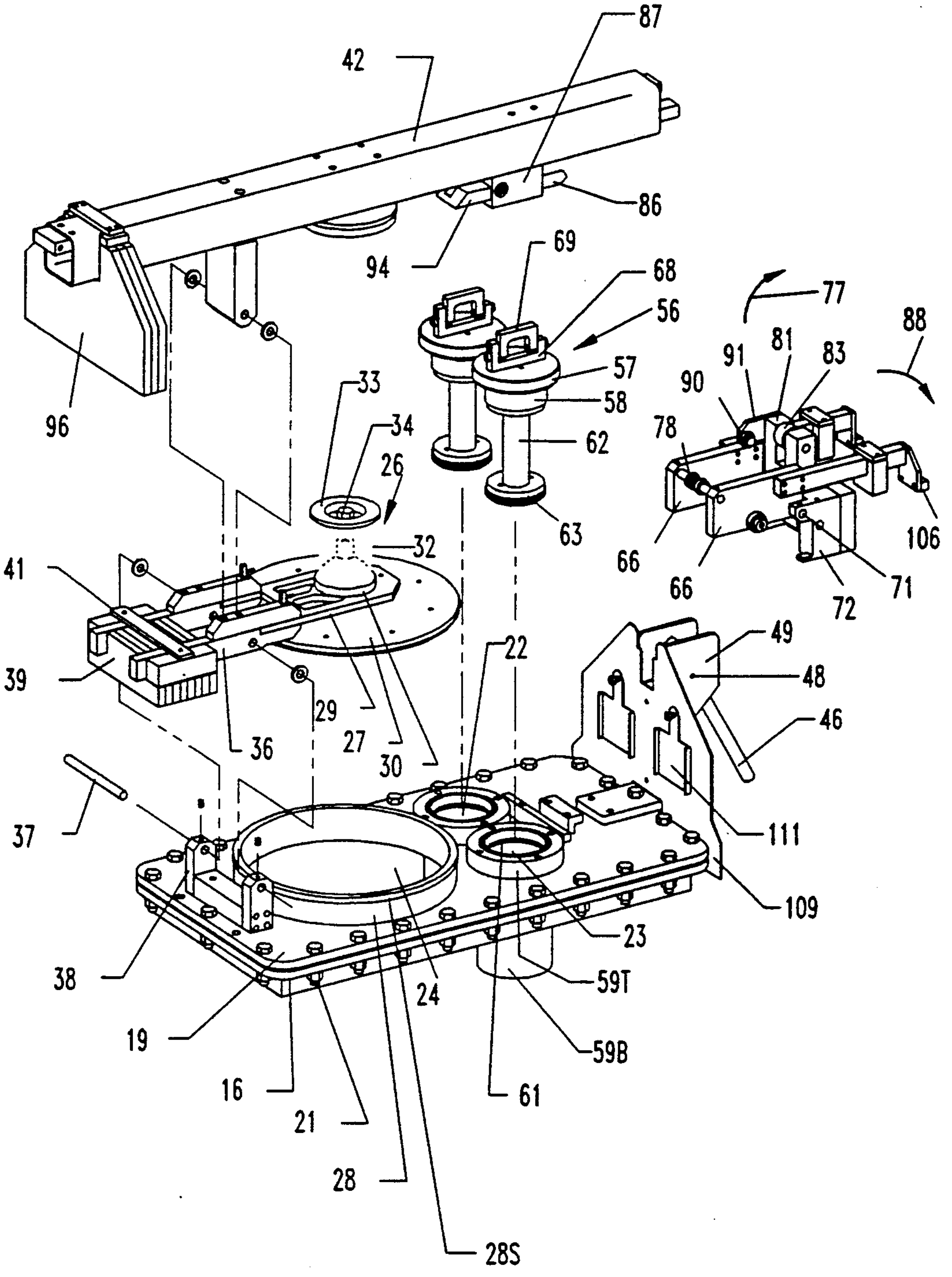
FIG. 3 is an exploded isometric view of the assembly as seen from the side opposite that shown in the other figures and also slightly looking forward from the rear toward the front of the assembly.

Referring to FIG. 1, the valve assembly 11 is mounted to the top 12 of the liquid cargo hold tank 13 of a vessel 14 such as a barge. For that purpose, a mounting flange 16 is welded at 17 to the top of the tank around a cutout 18. The valve assembly of the present invention has a base 19 secured to the mounting flange by a series of bolts 21 (FIG. 3). A Teflon brand seal is used between the base plate and the mounting flange.

The base plate has three valve mounting holes in it. Two of these 22 and 23 are used for mounting pilot valve assemblies and the large one 24 is used for mounting the main spill valve assembly. The main spill valve assembly 26 includes the valve seal plate 27 having a seal plate gasket 27S on the underside of it sealing the pipe seal flange 28 surrounding the opening 24 in the base plate by means of the EPDM pipe seal 28S.

There is a seal plate arm 29 secured to a spring bottom retainer 30 by four cap screws (not shown) installed upward through holes in the bottom of the seal plate arm into the retainer. There is a swivel housing 31 (FIG. 1) fastened to the top of the seal plate. There is an upstanding swivel rod (not shown) with its lower end swivel pinned at pin 31P to the housing 31. The spring retainer 30 with the seal plate arm attached is screwed onto the upper end of the swivel rod. A seal loading spring 32 is mounted on retainer 30 and secured in place by top retainer cap 33 connected to the bottom retainer by a central cap screw 34 screwed into the top of the bottom retainer to compress the spring to a preload of 800 pounds. The cap screw has a shoulder on it so that as the screwhead pushes top retainer down toward the bottom retainer, it stops on the shoulder, and the spring is preloaded to a force of 800 pounds.

The seal plate arm 29 is fastened to a pair of seal counterweight arms 36 which are pivotally pinned by pin 37 to pivot base yoke 38 fixed to plate 19. The swivel in 31P of the aforementioned swivel rod has an axis parallel to the axis of pin 37, both being parallel to the planes of the base plate 19 and the seal seating top rim surface of pipe seal flange 28. This arrangement assures uniform contact of the gasket 27S of the bottom of seal plate 27 with the top 28S of flange 28. However, until the clamp arm to be described, is pulled down onto the spring, the main valve disk seals the opening only to the extent possible due any difference between its own weight and the influence of seal plate counterweight 39 clamped to the rear portions of arms 36 by a mounting bar 41 secured to the counterweight by a screw at each end of the bar. An internal tank pressure of less than one-tenth pound per square inch (psi) is sufficient to open the valve.

In order to hold the main valve seal plate 27 seated and sealing the cargo tank shut, until the internal pressure reaches a predetermined upper desirable limit, a clamp arm 42 is placed over the main valve. A support post 43 fastened to the bottom of the clamp arm is pinned by pin 37 to yoke 38. When the clamp arm is latched down to the closed position as shown in FIG. 1, a downwardly opening cup 44 fixed on the underside of the arm engages the spring top retainer cap 33 and pushes down onto the retainer cap with a force slightly over 800 pounds, since it does compress the spring slightly during valve closure as the clamp arm is pushed down about its pivot pin 37 from the open position in FIG. 2. Although the clamp arm can be pushed down easily by hand to the point where the gasket 27S contacts valve seat 28S, the 800 pound spring preload makes it difficult to push the clamp arm down further for latching. Therefore, latch assist handle 46 is used. It has an upper end block 47 pinned at 48 to the housing 49. A latch assist lug 51 is fixed to the front end of clamp arm 42. When arm 42 has been pushed down by hand in the direction of arrow 52 such that gasket 27S contacts pipe seal 28S, lug 51 is in the position shown by the dotted line in FIG. 2. By pulling forward and up on the handle 46 in the direction of arrow 53, the rear face 47R of block 47 can be moved to the rear and down on top of lug 51 to enable forcing the clamp arm down against the 800 plus pounds of resistance from spring 32. As this occurs, a trigger latch assembly is set to hold the clamp arm down and valve 27 shut, but enable release of the latch when the internal pressure rises to a predetermined level.

The trigger assembly is operable by either one of two operating pilot valve/piston assemblies 56. Two are provided, for redundancy. They are essentially identical and each is received in a piston housing assembly 59T, 59B, received in holes 22 and 23 and they operate in the same way.

The pilot piston assembly includes a pilot valve disk 57 having a low-friction plastic seal unit 58 having a cylindrical portion and having a downwardly facing circular shoulder portion. This is one piece of material and it is received in a cylindrical piston housing assembly 59T, 59B open at its upper and lower ends and secured in the top of the base plate 19. The housing assembly 59 includes a seal receiver portion 59T at the top and a guide cylinder portion 59B extending down through the hole 23 in the plate. The seal receiver portion includes two grooves, one of them being in the cylindrical wall and receiving a lip-type seal 61 made of VITON or EPDM material received in the cylindrical groove in the wall of the cylinder, and the other being a groove in the top of the seal receiver portion and receiving a ring seal therein. The cylindrical portion of the piston seal 58 is received in the lip seal, while the shoulder flanged portion is received on the top seal ring when the piston assembly is resting in the piston housing assembly. A piston rod 62 and guide disk 63 extend down from the top flange seal unit 57. These are simply for the purpose of guiding the pilot valve as it is installed and as it operates. The piston guide disk 63 does not seal against the wall of the portion 59B.

The pressure at which the pilot valves lift from their seats, is determined by their weight. Thus, the valve can be set to trip at a different pressure by installing heavier or lighter pistons. In order to respond to them when the internal pressure has reached the desired upper limit, the arm latching trigger lever assembly is used. This includes a trigger arm 66, which has an outwardly extending shaft with a roller bearing 67 (FIG. 2) on it. This bearing is received on the top of a saddle 68 fixed on top of the pilot valve head 57. A bail 69 is mounted to the top of the saddle and extends across and immediately above the top of the roller 67. Each of the two trigger arms 66 is pivotally mounted through shaft 71 to left and right trigger arm mounts 72 which are fixed to a spacer block 73. Each of the mounts 72 has a rearwardly projecting toe 74 received under a bar 76 which is spaced above but fixed to base plate 19, whereby mounts 72 and spacer block 73 are retained on the base 19. Because of the relationship of the operating roller 67 to the pivot axis 71 of the trigger arm 66, an increase of internal pressure in the tank, upon lifting the pilot valve, will lift the roller and pivot the trigger arm in the direction of arrow 77 in the drawings. Each trigger arm has another roller 78 on it which is located slightly to one side of a vertical plane containing the center line of the clamp arm and below the clamp arm.

Figure 4:
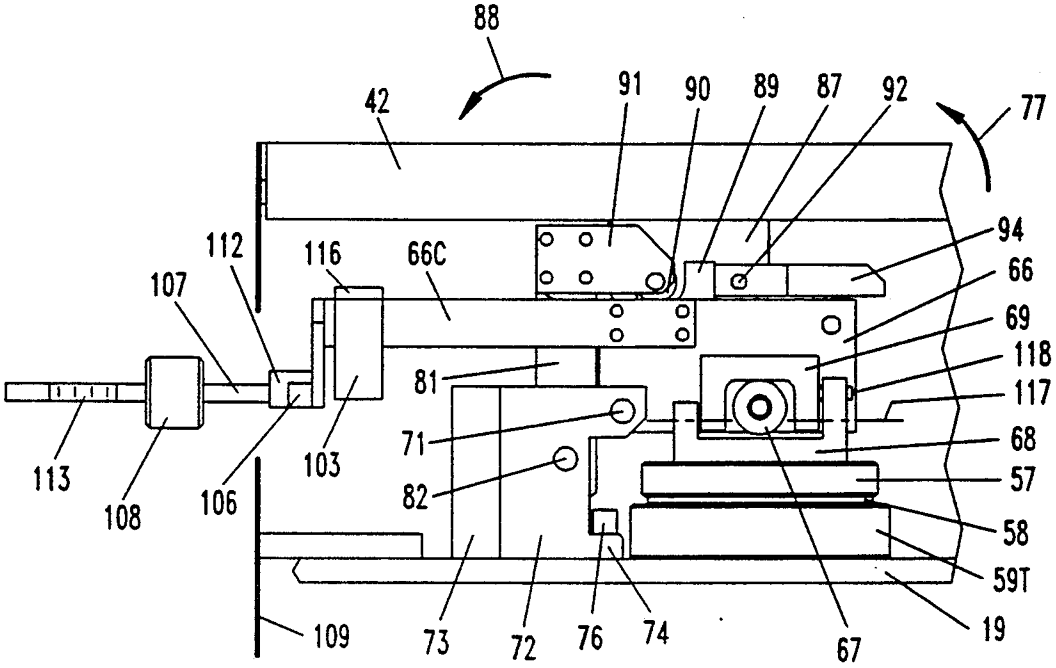
FIG. 4 is an enlarged fragmentary side elevational view of the operator portion of the assembly in the closed condition of FIG. 1.
Figure 5:
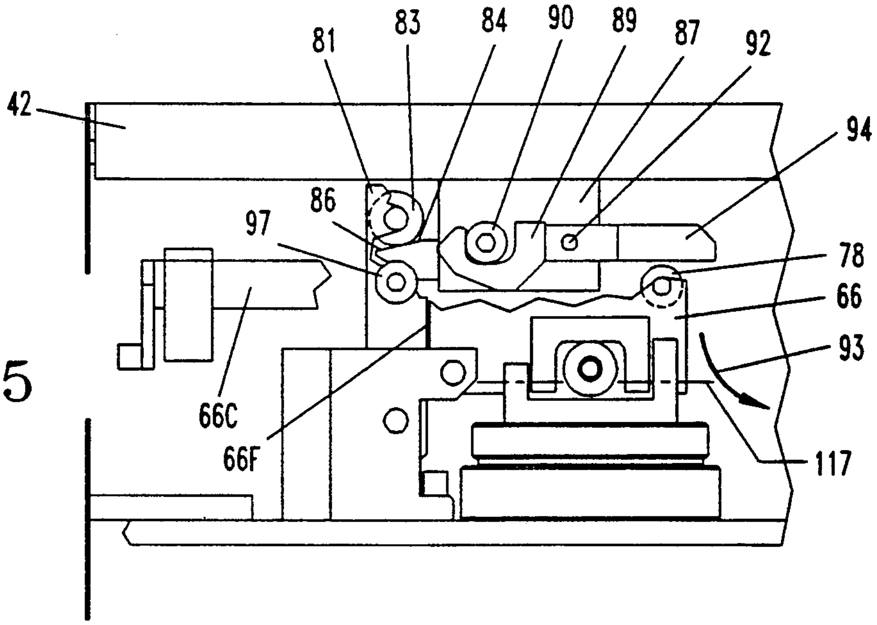
FIG. 5 is a view like FIG. 4 but with portions of the trigger arm and latch arm broken away to show some features hidden from view in FIG. 4.
Figure 6:
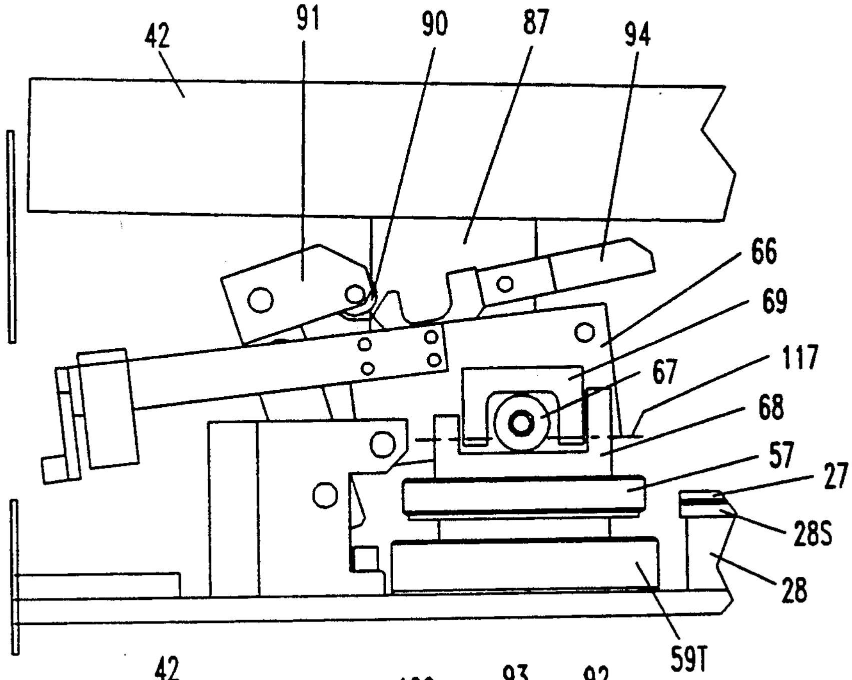
FIG. 6 is a side elevational view similar to FIG. 4 but showing the operator immediately after triggering.
Figure 7:
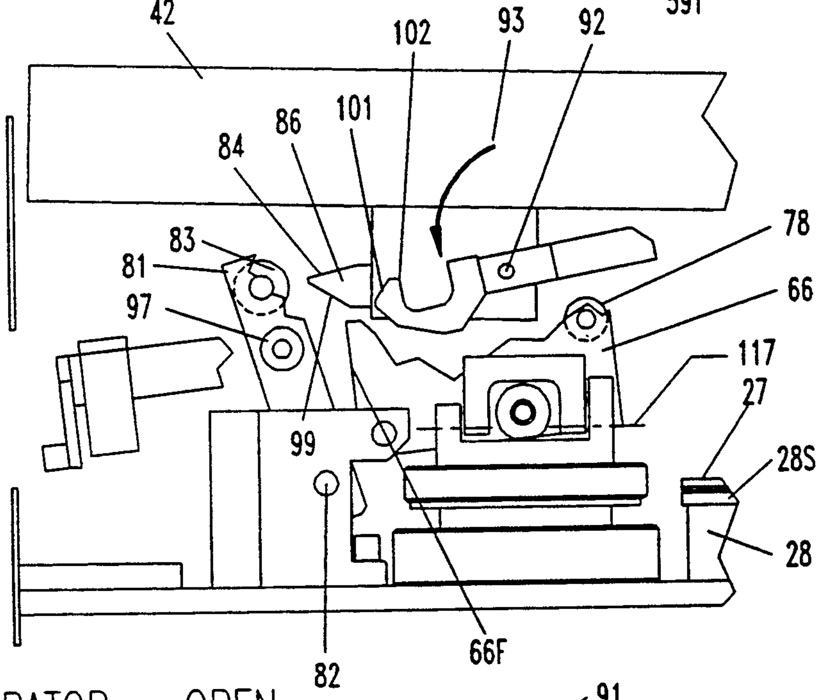
FIG. 7 is a view like FIG. 6 but with portions of the trigger arm and latch arm broken away to show features hidden in FIG. 6.

Turning away for a moment from the trigger mechanism itself, it is appropriate to look at the clamp arm latch arm 81. It is pivotally mounted through a latch arm shaft 82 to the trigger arm mounts 72. It has an upwardly opening yoke at the top which has a roller 83 in it which is normally disposed on the top 84 of a latching stud 86 (FIGS. 2 and 5) affixed to a mounting block 87 affixed to the bottom of the clamp arm. The latch arm is pivotally mounted to pivot about the axis of shaft 82 in the direction of arrow 88 in the figures. There is a slight downward slope from rear to front (toward the distal end) of the latching stud 86 and which, when the clamp arm is biased upward by the main valve spring 32, tends to urge the latch arm forward in the direction of arrow 88 about the axis 82. This forward action is Prevented by a latch hook 89 (FIGS. 2, 5 and 7) which is hooked under latch arm retaining roller 90 which is mounted on the inside wall of a rearward projecting arm 91 fixed to one side of the upper end of latch arm 81. The latch hook is pivotally mounted on pin 92 to block 87. This hook is operable from the locking position shown in FIG. 5 in a counterclockwise direction of arrow 93 about pin 92. At the rear end of this hook unit and centered under the clamp arm is a push plate 94 engageable by the roller 78 on either latch arm 66 to move the push plate upward from the rest position shown in FIGS. 1, 4 and 5 to the hook release position shown in FIGS. 6 and 7.

Figure 2:
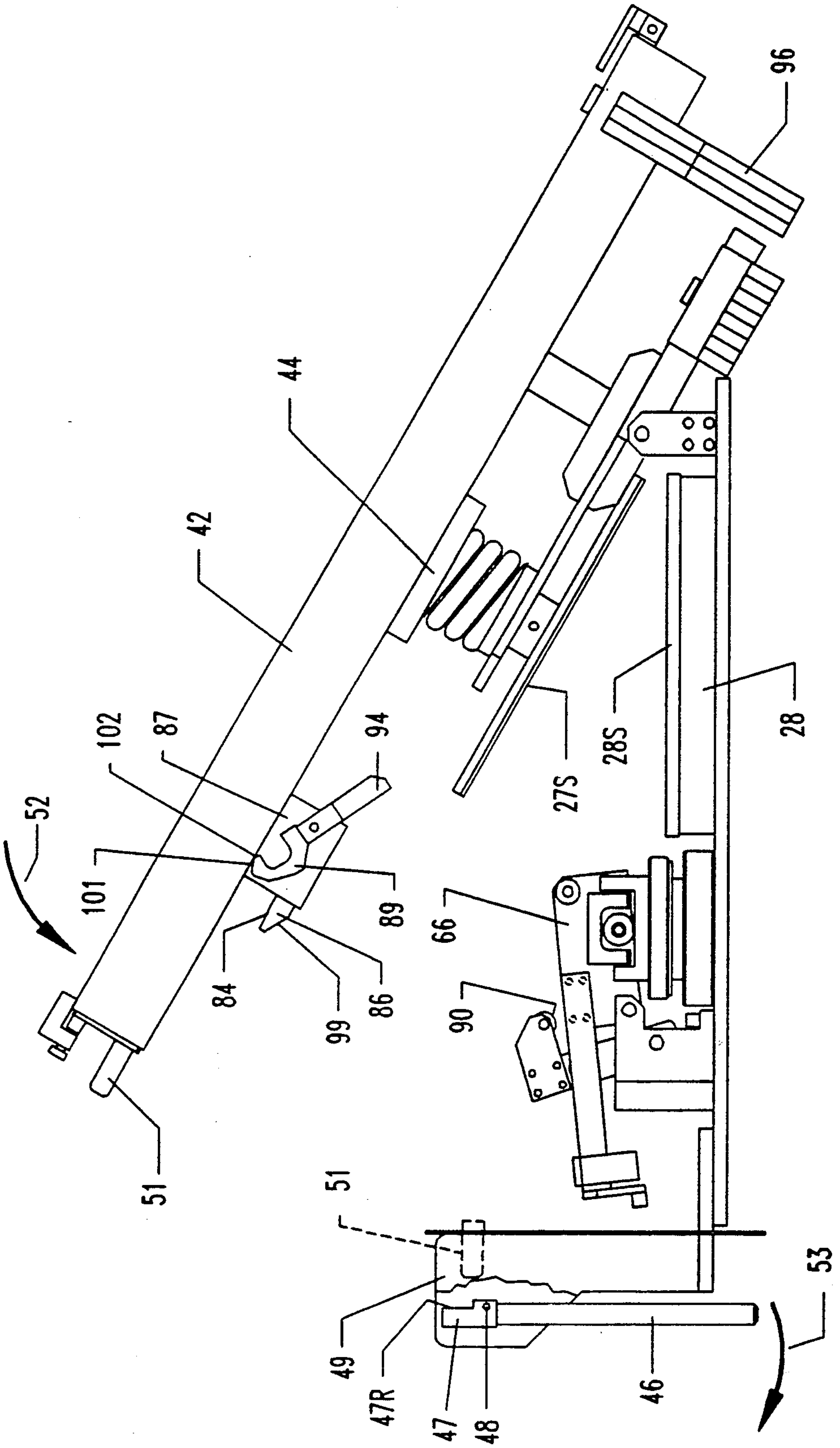
FIG. 2 is a view like FIG. 1 but showing the assembly after it has been triggered as a result of excessive internal pressure in the tank.

From the foregoing, it can be seen that, when either of the pilot valves rises due to internal pressure in tank 13, it will rock the associated trigger arm 66 in a counterclockwise direction as viewed in all the figures except FIG. 3. Then, the action of the associated roller 78 against the push plate 94 rocks the hook in a counterclockwise direction to pull the hook down from the latch arm retaining roller 90, which releases the latch lever so that the sloped top 84 of the latch stud 86 pushes the latch arm roller off the stud whereupon the spring 32 snaps the arm upward to the open position of FIG. 2 against a stop. It will remain in that upward released position due to the counterweights 96 mounted to the rear end portion of the clamp arm. Then the pressure inside the tank can lift the main valve disk off its seat to whatever extent needed to spill whatever portion of the tank contents are needed to reduce the pressure as needed. Note that while the main valve is shown in FIG. 2 up as far as it could possibly go, it is not likely to open so much as shown.

If it should happen that the cam surface 84 on the top of the latch stud does not achieve the release of the latch arm by pushing the roller 83 off the top 84 of the latch stud, further movement of the pilot valve upward off its seat causes the trigger arm 66 to rock further forward so that the front wall 66F thereof engages a further roller 97 on the latch arm 81 to force the arm 81 further forward in the direction of arrow 88 so that the roller 83 is moved off the stud 86 and the clamp arm is released.

Figure 8:
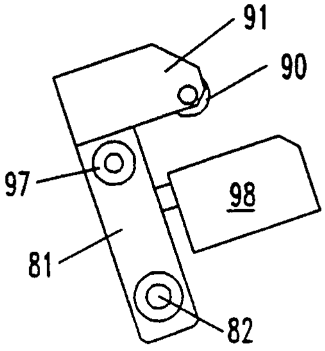
FIG. 8 is a side elevational view of the latch arm of FIG. 7 and showing the return counterweight thereon.

After the clamp arm is released to the open position, and if the pilot valves return to their original position at rest on their seats, their bails 69 will pull the trigger arms back down to their original position. The latch arm 81 will return to its original position as in FIGS. 1, 4 and 5 due to the counterweight 98 (FIG. 8) fixed to the rear of the latch arm and extending to the rear of the pivot axis 82 of the latch arm. The hook 89 will remain in its position on the clamp arm as shown in FIG. 2, due to the counterweight effect of the push plate 94.

To return the clamp arm 42 to its original position, it is pulled down by hand until the spring retainer receiving cup 44 is resting on the top of the spring retainer cap 33, the latter always being secured to the valve itself by the cap screw 34 establishing the preload of the spring 32. From that point it cannot readily be pulled down by hand and must be forced down with the aid of the resetting lever handle 46 as previously described. As the lower end of the handle 46 is pulled outward and forward to pull the latching clamp arm 42 down against the spring preload, the upwardly and forwardly curved lower surface 99 (FIG. 2) of the latch stud engages roller 83 and pushes latch arm 81 forward into position where the roller can return over the top 84 of the latch stud as arm 42 is pulled further down. As this occurs, roller 90 engages ramp 101 on the hook, and pushes the hook down so that, as soon as roller 90 passes point 102, the hook can rise to again lockingly engage the locking roller 90 on the latch arm. The assembly is thereby reset, and the handle 46 can be released to return to its original position. To make fine adjustment of the pressure point at which a pilot valve will release the trigger hook, there is a counterweight 103 on the latch balance arm. It is adjustable longitudinally. But the main factor is the weight of the piston. It can be a heavy (30 lb.) piston for a 3 psi setpoint in one barge, or a light (10 lb.) for a 1 psi setpoint in another barge.

To facilitate field test of set point, there is a test rod mounting flange 106 secured to the front end of 66C. A test rod 107 (FIG. 4) has a weight 108 slidable longitudinally on a scale marked on the rod. The rod is inserted rearward through an opening in the front wall 109 (FIG. 3) of the housing, after swinging the door 111 to the side. The rod has a mounting head 112 with a downward projecting pin (not shown) that is received downward in a hole in the flange 106 on the adjustment rod. The weight 108 is first located near the front wall 109. Then the weight 108 is moved forward toward the free end until it rocks the trigger arm 66 to release the hook and thereby trip the assembly. Then the location of the weight on the scale 113 on the rod is noted. If it is not at the scale marking corresponding to the desired trip pressure, the counterweight 103 on the counterbalance arm 66C of the trigger arm is adjusted longitudinally and then secured in place by the clamp bar 116 at the location where the valve will be triggered upon the attainment of the internal pressure intended for release of the main spill valve.

If it is desired to remove either of the pilot valve/piston assemblies, it is necessary to first trip the unit so arm 42 is open. Then disconnect the associated trigger arms. For that purpose, the bails 69 are pivotally mounted about axes 117 so that, upon pulling out the retainer pin 118, the bail can be pivoted outward and downward out of position over the roller 67 on the trigger arm. Then the mounts 72 can be pulled forward from capture under bar 76. Then the entire operator comprising the mounts, spacer 73, trigger arms and latch arm can be lifted and removed. Then the pilot valve/piston assemblies can be lifted out of their respective receiver cylinder seat assemblies.

In the foregoing description, the operation of various components has been described. Several of them, in addition to the reset lever, can be considered levers of various classes, depending on the location of the operating force, the fulcrum and the load to be moved. For example, the combination 89, 92, 94 can be considered a first class lever; arm 42 can be considered a second class lever; and arm 66 can be considered a third class lever. Of course, levers of these classes can exist in a variety of shapes.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. On a liquid cargo tank of a marine vessel, a spill valve assembly comprising:
 - a main spill valve seated in an opening in the tank;
 - a main valve clamp arm holding the main valve closed;
 - a latch arm having a first position retaining the clamp arm in valve holding condition, and having a second position releasing the clamp arm;
 - a latch hook having a first position normally retaining the latch arm in the first position but operable to a second latch hook position to free the latch arm from the restraint of the hook;

a pilot-operated trigger arm operable on the latch hook to move the latch hook from the latch arm retaining position to the second latch hook position; and a pressure responsive pilot valve seated in an opening in the tank and responsive to pressure in the tank to move off its seat, the trigger arm being associated with the pilot valve for operation of the trigger arm in response to development of a predetermined internal pressure in the tank.

2. The assembly of claim 1 and wherein:

the latch arm and the hook are pivotally mounted and counterbalanced for return of the latch arm to the first position and for return of the hook to the first position.

3. The assembly of claim 1 and wherein:

the trigger arm is directly engagable with the latch arm for moving it from the first position to the second position upon freedom from restraint of the hook.

4. The assembly of claim 1 and further comprising:

a spring establishing a bias between the clamp arm and the main valve.

5. The assembly of claim 4 and wherein:

the spring is a high rate spring having a predetermined load and which is further loaded upon placement of the clamp arm in the valve holding position.

6. The assembly of claim 5 and further comprising:

a test rod receiver on the trigger arm for field testing of the valve-opening set point pressure.

7. The assembly of claim 4 and further comprising:

a latching stud cam on the clamp arm and a cam follower on the latch arm the cam follower normally and lockingly engaging the latching stud cam when the latch arm is retained by the hook, the biasing spring normally urging the cam in a direction tending to drive the cam follower off the cam to disengage the cam follower from the cam whereby, when the latch hook is moved to the second position, the cam follower is driven off the cam out of the first, clamp arm retaining position and thereby enabling the clamp arm to move from valve holding condition.

8. The assembly of claim 7 and wherein:

the cam follower is a roller.

9. The assembly of claim 7 and further comprising:

a roller on the trigger arm;

a saddle and bail on the pilot valve capturing the trigger arm roller under the bail and atop the saddle whereby the trigger arm is moved to operate the latch hook as the pilot valve rises from and falls to its seat.

10. The assembly of claim 9 and wherein:

the trigger arm is pivotally mounted and has counterbalance means thereon, the counterbalance means being movable on the trigger arm to precisely determine the pressure at which the pilot valve will lift the trigger arm to move the latch hook to the second latch hook position.

11. The assembly of claim 10 and wherein:

the pilot valve includes a seal disk and a mass body depending from the seal disk and having a combined weight of the body and disk and trigger arm and counterbalance such as to cause the trigger arm to move the latch hook to the second latch hook position upon attainment of internal pressure in the tank of from 0.5 pounds per square inch to 3.5 pounds per square inch.

* * * * *